Figure 1:
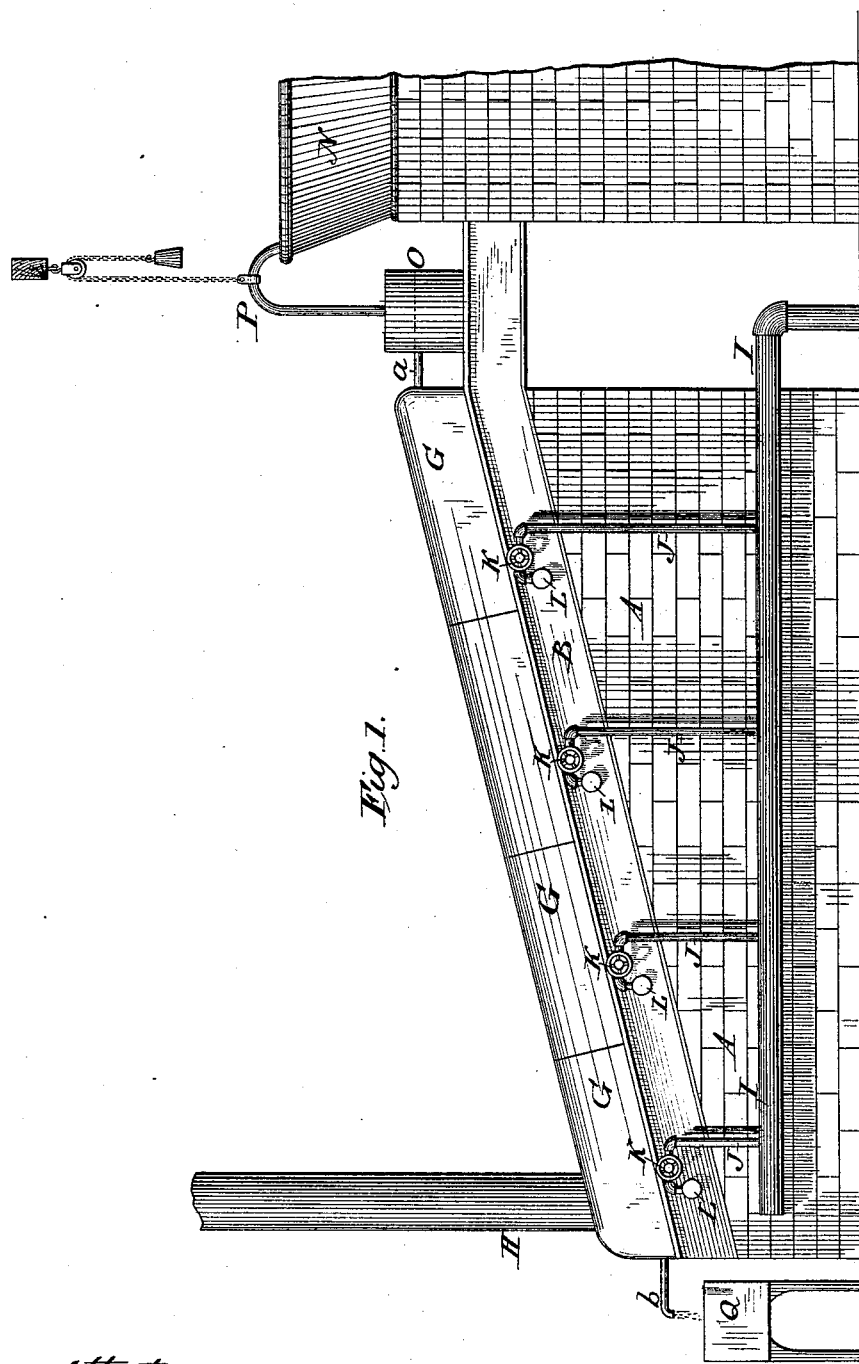

(No Model.)  4 Sheets—Sheet 1.

J. GRIDLEY.
Process of and Apparatus for Concentrating Sulphuric Acid.

No. 240,248.  Patented April 19, 1881.

Attest.
Sidney P. Hollingsworth
Jno. H. Voorhees

Inventor.
Junius Gridley,
By his Attorneys,
Stansbury & Munn (No Model.)
4 Sheets—Sheet 2.
J. GRIDLEY.
Process of and Apparatus for Concentrating Sulphuric Acid.
No. 240,248.　　　　　　　　　Patented April 19, 1881.
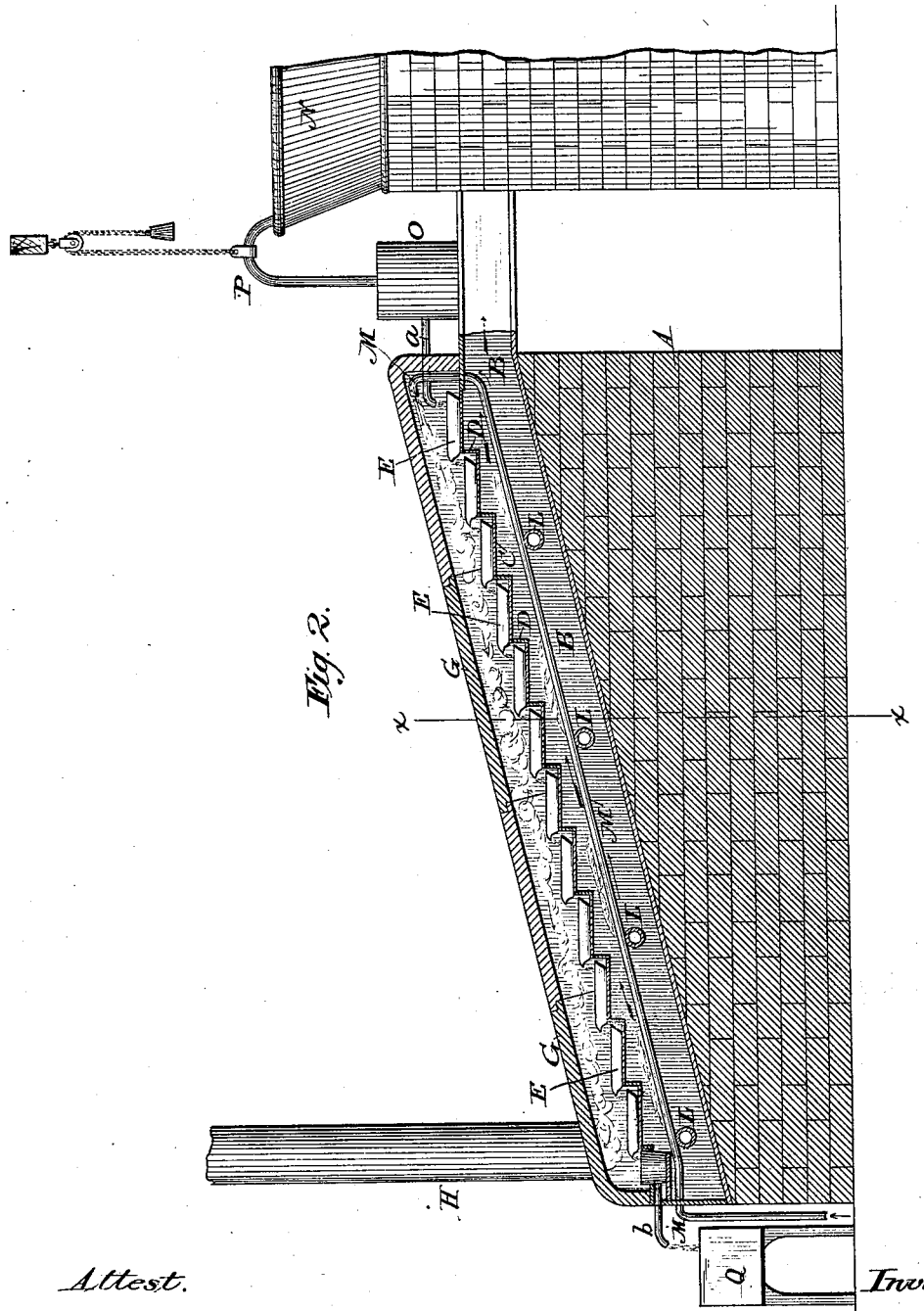
Attest.
Sidney P. Hollingsworth
Jno H Voorhees
Inventor.
Junius Gridley,
By his Attorneys,
Stansbury & Munn (No Model.)  4 Sheets—Sheet 3
J. GRIDLEY.
Process of and Apparatus for Concentrating Sulphuric Acid.
No. 240,248. Patented April 19, 1881.
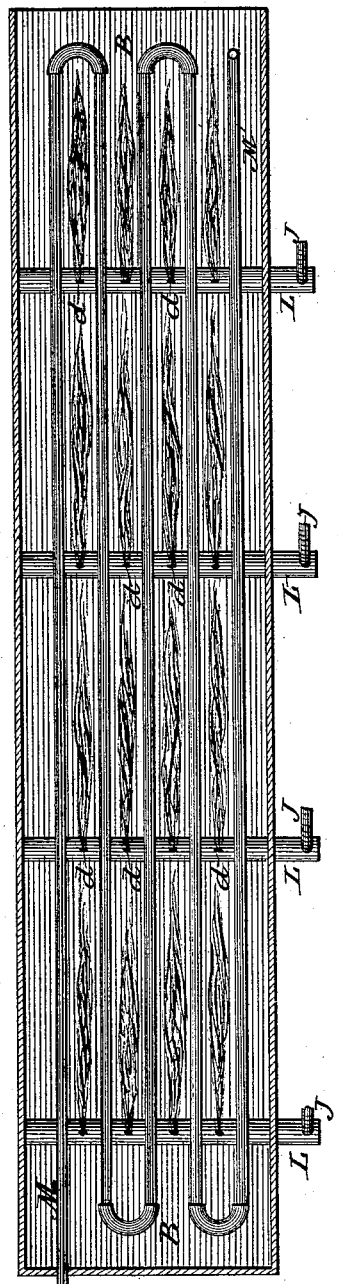
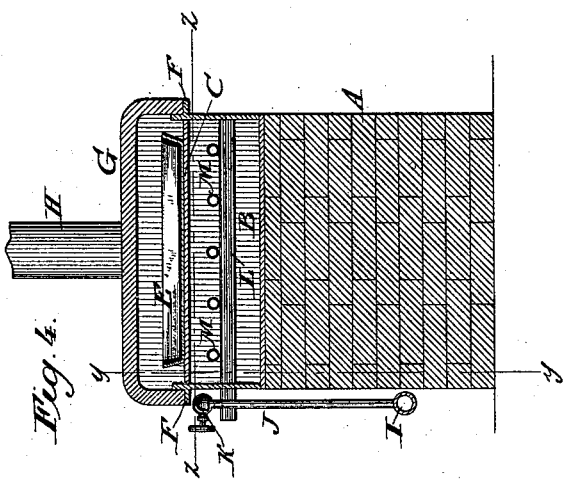
Attest.
Sidney P. Hollingworth
Jno W Voorhees
Inventor.
Junius Gridley,
By his Attorney,
Stansbury & Munn.
N. PETERS, PHOTO-LITHOGRAPHER, WASHINGTON, D. C.

(No Model.) 4 Sheets—Sheet 4.
J. GRIDLEY.
Process of and Apparatus for Concentrating Sulphuric Acid.
No. 240,248. Patented April 19, 1881.
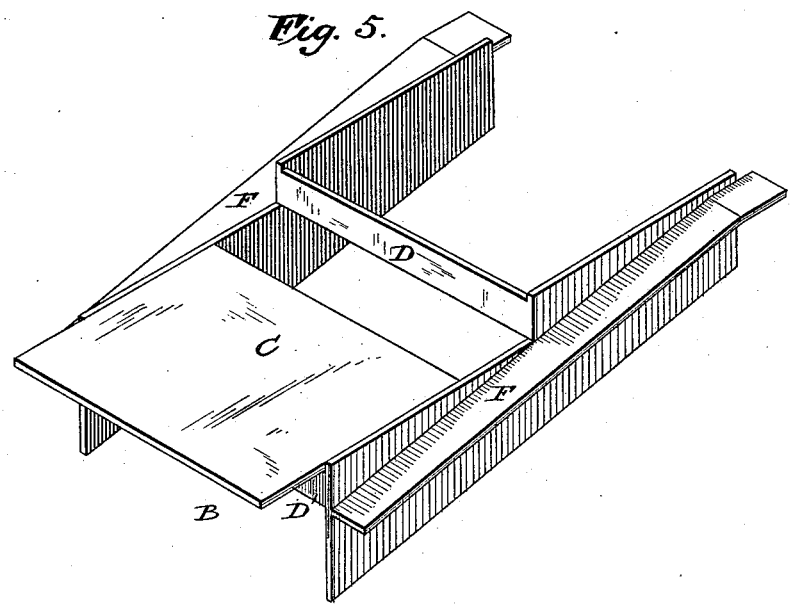
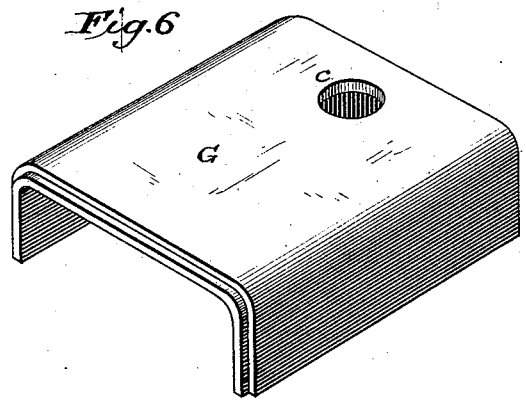

UNITED STATES PATENT OFFICE.

JUNIUS GRIDLEY, OF BROOKLYN, NEW YORK.

PROCESS OF AND APPARATUS FOR CONCENTRATING SULPHURIC ACID.

SPECIFICATION forming part of Letters Patent No. 240,248, dated April 19, 1881.

Application filed January 21, 1881. (No model.)

*To all whom it may concern:*

Be it known that I, JUNIUS GRIDLEY, of Brooklyn, in the county of Kings and State of New York, have invented certain new and useful Improvements in Processes of and Apparatus for Concentrating Sulphuric Acid; and I do hereby declare that the following is a full, clear, and exact description of the invention, which will enable others skilled in the art to which it appertains to make and use the same, reference being had to the accompanying drawings, and to letters of reference marked theron, which form a part of this specification, in which—

Figure 1 represents a side elevation; Fig. 2, a longitudinal vertical section of a part of the same on the line $y\,y$ of Fig. 4; Fig. 3, a top-plan view on the line $z\,z$ of Fig. 4; Fig. 4, a vertical cross-section on the line $x\,x$ of Fig. 2, and Figs. 5 and 6 perspective views of parts detached.

The concentration of sulphuric acid is now, and has heretofore been, almost exclusively carried on in retorts composed of either platinum or glass of various forms. Platinum is the most satisfactory material in use, but its great cost entails so serious an outlay that it has given to manufacturers having the means to employ it almost a monopoly of the manufacture of strong sulphuric acid. Glass retorts are exceedingly unsatisfactory. The method of concentration by them is expensive, owing to the large amount of fuel required, the frequent breakages, and consequent wear and tear, and, besides, are dangerous to the employés. For these reasons they are usually discarded as soon as the parties using them can afford to use platinum.

Practical experience has developed the fact that for rapid and economical concentration it is necessary to give the largest boiling-surface possible on a thin body of acid, and to drive from the surface of the boiling acid the steam generated as soon as it rises. The recent improvements in platinum apparatus are all in this direction. The employment of pans for concentration has been a necessity from the commencement of the manufacture. In use the heat is generally applied underneath the pan, though in Europe the common method in alkali-works is to carry the heat over the surface, but the acid is so much discolored by the smoke and cinders as not to be merchantable for many purposes, and the product is mostly used for the manufacture of the sulphate of soda.

My invention has for its object the concentration of the dilute acid rapidly, cheaply, and in a merchantable condition; and it consists of a novel process applied by means of a novel apparatus. The process consists in applying strong heat to the under surface of a continuously-flowing thin body of dilute acid, and at the same time applying a strong heat to the upper surface and in such a manner as to drive off rapidly all vapor or steam rising from the boiling acid by means of the novel apparatus constructed as hereinafter described.

In the drawings, A represents a base of brick-work with an inclined upper surface with a cast-iron flue, B, arranged thereon, as shown in Figs. 1 and 2. This flue is made with an open top, but in such a manner as to be tightly closed by a series of metallic sliding plates, C, in connection with the vertical cross-pieces D, as shown in Fig. 2, but more clearly in Fig. 5. These plates are arranged so as to be parallel with each other and at different heights, so as to form a series of steps, as shown in Fig. 2. Upon each is placed a pan, E, made of glass, porcelain, or enameled metal, with a small projecting lip on one side. They are set in a range, so that the lip of the highest will project over the edge of the pan next lower, as shown in Fig. 2, and each may be set in a separate enameled pan, as shown in Fig. 4.

A flange, F, projects from and around the flue B, below the line of the sliding plates C, and upon it is placed a series of tiles, G, so as to completely and tightly cover the plates C with a hood, as shown in Fig. 1. These tiles are made with flanges on their ends, so as to fit tightly together, and are prepared by being boiled in coal-tar and oil to resist the action of the gas, and may be provided with indentations on their sides to insert hooks for convenience in handling when hot. The interior of this hood forms a flue over the pans, as shown in Fig. 2, and is provided with a pipe, H, as shown in the same figure, for the escape of air, steam, and gas, as shown in the same figure.

In the arrangement of the pans the upper or highest one is provided with a small opening for the insertion of a pipe, $a$, through which the dilute acid is supplied, and the lowest pan or cup with a similar opening for a pipe, $b$, through which the acid as concentrated is delivered.

The fuel used in the process may be either naphtha from petroleum or carbon monoxide from a generator. Naphtha is preferred, because it is cheaper and more easily controlled. It is conveyed by an iron pipe, I, from an elevated reservoir placed at a safe distance from the works, and fed from this by pipes J, provided with cocks K to regulate the supply, as shown in Fig. 1, to pipes L, arranged inside and across the under flue, B, as shown in Fig. 2, but more clearly in Fig. 3. These pipes L are provided with small openings, $d$, through which the naphtha is supplied to the flame, as shown in said Fig. 3.

M, Figs. 2, 3, and 4, is a pipe for superheating steam, or highly heating air, to be discharged into the upper flue over the pans. It enters the lower end of the flue B, then passes in coils over the pipes L, upon which it rests, and then on through a suitable opening, in which it fits closely, into the upper end of the flue under the hood, as shown in Figs. 2 and 3.

After the parts are all arranged as thus described, and the joints made perfectly tight by suitable material, the dilute acid is fed from the feeding-pan N into a cup, O, by means of an adjustable siphon, P. From this cup it is fed by the small pipe $a$, inserted through the upper flue, to the highest pan in the series or range, and then drips along from pan to pan, forming a thin body of the acid on each pan equal in thickness to the height of the lip from the bottom, as shown in Fig. 2. The naphtha is then turned on and lighted by any suitable material introduced through a small sliding door (not shown) at the lower end of the flue, which serves at the same time to supply the air necessary to support the combustion. The flames of the naphtha pass upward, as shown by the arrows in Fig. 2, heating the lower surfaces of the pans, and thus causing the dilute acid to boil. At the same time the flames surround the coiled pipe M, causing the steam or air therein to be highly heated and to pass on through the pipe and be discharged into the flue under the hood, as shown in said Fig. 2, when it increases the surface-heat on the liquid in the pans and carries off all vapors arising from the same to the pipe H in the direction of the arrows, as also shown in said Fig. 2, and so on to the chamber, or to a separate chamber for condensation. The dilute acid being thus subjected to great heat on its under and upper surface at the same time, and having all vapors rising from it carried away at once, is rapidly condensed as it passes from pan to pan, and is delivered into a platinum cup, and thence through the pipe $b$ into a cooler, Q, as shown in Figs. 1 and 2. The heat from the naphtha-flames may be further utilized by passing the flue B out under the cup O and on under the feeding-pan N. All of the metal surfaces within the hood may be enameled, to protect them from the acid fumes or gas, if necessary, and if the joints made by the flanges do not sufficiently prevent the escape of gas a movable hood of asbestus boiler-covering may be used.

I am aware that heat without blast above and below a series of pans has been applied in the concentration of sulphuric acid, but this I do not claim; but What I do claim as my invention is—

1. The process herein described of concentrating sulphuric acid, which consists in applying a strong heat to the under surface of a thin body of the dilute acid, and at the same time applying a strong blast of superheated steam, or highly heated air, to the upper surface in a close flue and driving off all vapors as they rise, substantially as set forth.

2. An apparatus for concentrating sulphuric acid, consisting of the under flue, B, provided with the adjustable sliding covers C, the upper flue made of tiles G, the pans E, pipe M, and pipes I, J, and L, when constructed and arranged to operate substantially as herein shown and described.

In testimony that I claim the foregoing as my own I affix my signature in presence of two witnesses.

JUNIUS GRIDLEY.

Witnesses:
HENRY COFFIN,
EUGENE WAUGH.